March 28, 1933.   G. P. BALL   1,902,820
AUTOMOBILE LIFT
Filed Feb. 13, 1931   2 Sheets-Sheet 1
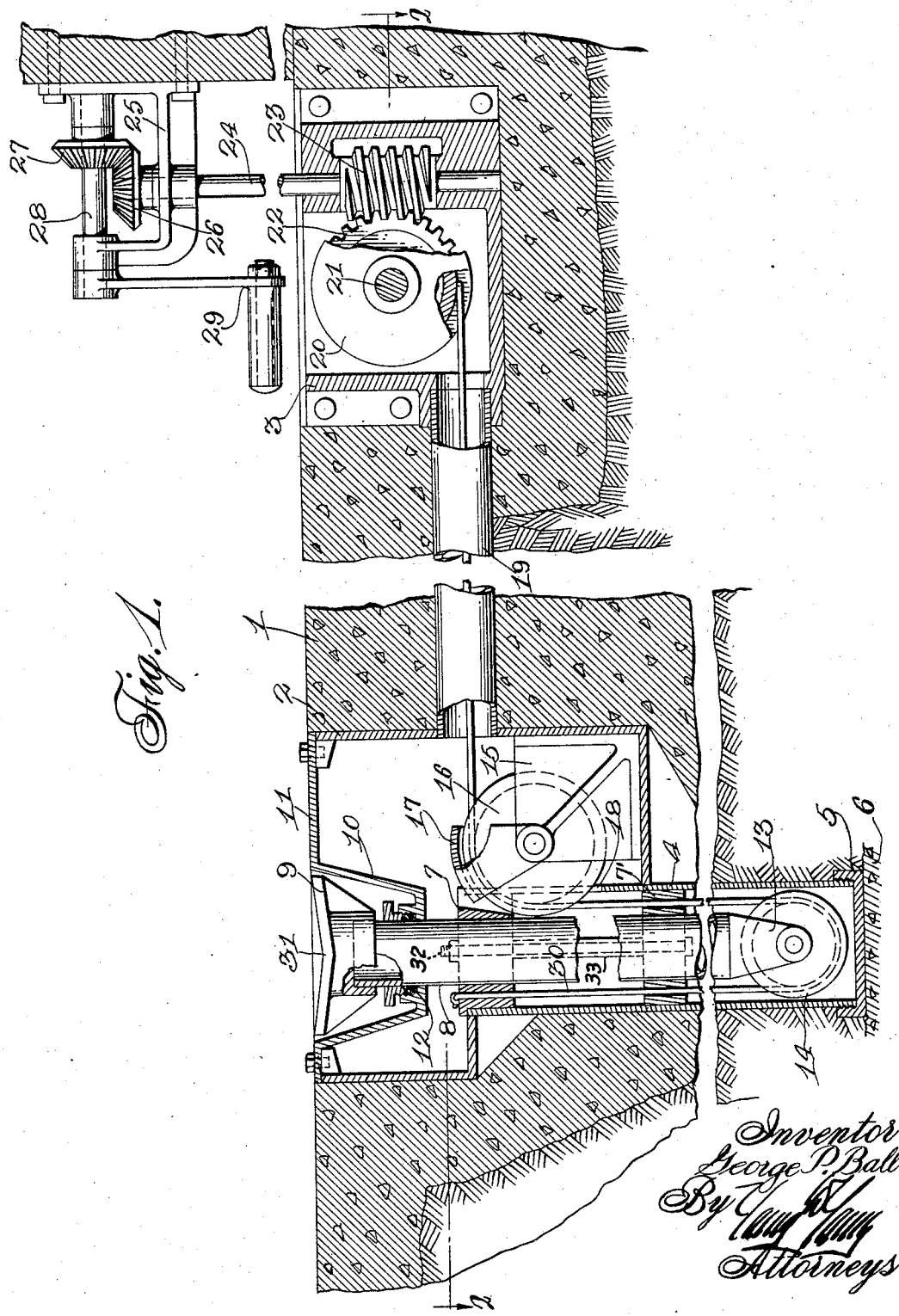

March 28, 1933.  G. P. BALL  1,902,820
AUTOMOBILE LIFT
Filed Feb. 13, 1931  2 Sheets-Sheet 2

Inventor
George P. Ball
By [signature]
Attorneys

Patented Mar. 28, 1933

1,902,820

UNITED STATES PATENT OFFICE

GEORGE P. BALL, OF ALLENTOWN, PENNSYLVANIA

AUTOMOBILE LIFT

Application filed February 13, 1931. Serial No. 515,462.

This invention relates to an improved automobile lift.

One of the objects of the present invention is the provision of an improved lifting device which is particularly constructed for installation in a garage or the like, whereby the same can be used for raising either the front or rear end of a motor vehicle to place the same in a convenient position so that access can be gained to the parts beneath the car for repair purposes and the like.

Another object of the present invention is the provision of an automobile lift wherein the raising or lifting standard is mounted and operated similar to the main standard in my co-pending application on combination portable car loader and unloader which bears Serial #352,724 and was allowed on August 28th, 1930, and further includes novel means manually operated for actuating the standard so that the same can be raised and lowered within the bearing.

A still further object of the present invention is the provisioin of an automobile lift which can be quickly and easily set in position in the floor surface of a garage, or the like, and is preferably set in a cement foundation to rigidly hold the parts against movement so that the device can be readily operated for raising and lowering a motor vehicle from either end thereof.

With the above and other objects in view, the invention consists in the novel features of construction, the combination and arrangement of parts hereinafter more fully set forth, pointed out in the claim and shown in the accompanying drawings wherein:

Figure 1 is a side elevation illustrating the device installed in a cement floor portion, with parts thereof broken away and illustrated in cross section;

Figure 3:
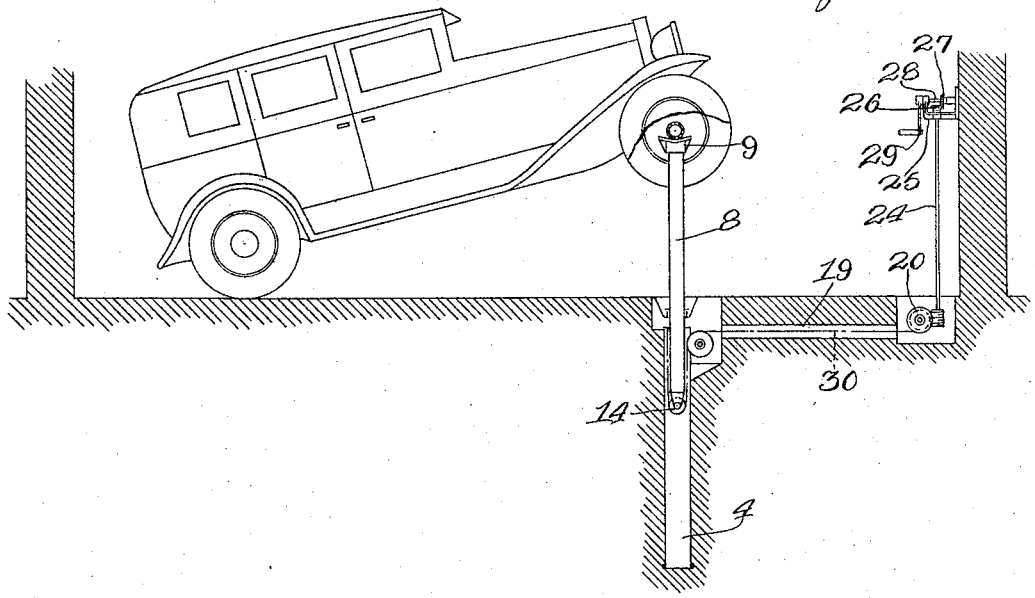
Figure 3 is a diagrammatic view illustrating the use of the device.
Figure 2:
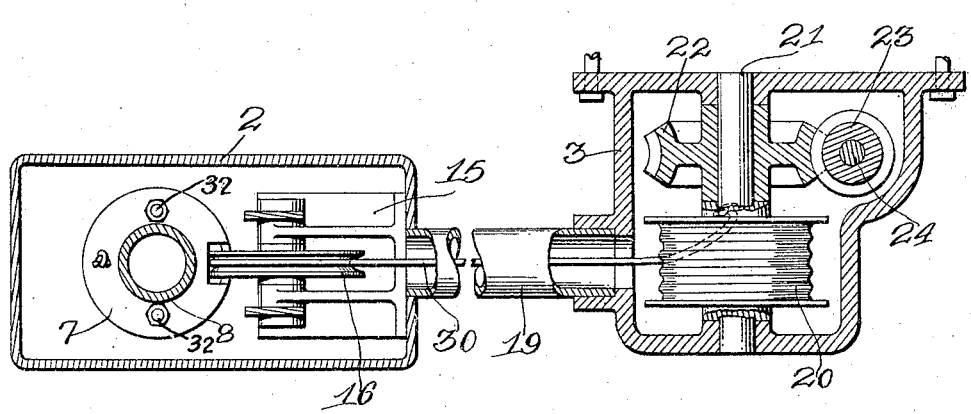
Figure 2 is a sectional view on the line 2—2 of Figure 1.

In the accompanying drawings, I have illustrated my improved automobile lift as installed within a garage, with the operating mechanism embedded or positioned in a cement section 1. The device includes a main housing 2 for the lifting standard and an auxiliary housing 3 for the driving mechanism. Extending downwardly from the housing 2 is a cylinder 4 which projects below the main cement section 1, with its lower end normally closed by means of a detachable cap 5 which rests upon a cement base 6.

Within the cylinder 4 are spaced guides or bearings 7 and 7', the guides 7 being located at the upper end of the cylinder 4. Slidably mounted in a vertical plane within these guide members, is a movable standard 8 carrying a head piece 9 at its upper end which is normally positioned within a depressed portion 10 formed in the cover 11 of the housing 2.

The bearing block 7' is anchored in position by tie rods 32 which carry spacing thimbles 33.

The bottom of the depressed portion carries a packing gland 12 surrounding the standard 8 to prevent water from getting into the top chamber or housing 2. The lower end of the standard 8 is provided with spaced ears 13 and arranged between these ears is a pulley 14. A supporting bracket 15 is arranged in the housing 2 adjacent the cylinder 4 and this bracket 15 supports a pulley 16 having a guard 17 arranged thereover. The inner edge of the pulley extends into a slot 18 in the cylinder 4, so that a portion of the pulley projects into the cylinder, as shown in Figure 1.

Extending laterally from the housing 2 and communicating with the interior thereof is a tube 19 which leads into the auxiliary housing 3. A drum 20 is mounted upon a transverse shaft 21 within the housing 3, and arranged upon the shaft 21, adjacent the drum, is a worm gear 22 which meshes with a worm 23 on the drive shaft 24. This drive shaft 24 extends upwardly from the housing 3, with its upper end supported in a bearing carried by the bracket 25. Mounted upon the upper end of the shaft 24 is a bevel gear 26 meshing with a similar gear 27 on a stub shaft 28, and the shaft 28 has an operating crank 29 on the outer end thereof, whereby the same may be manually rotated.

In order to raise and lower the standard 8, a cable 30 has one end fixed to the bearing 7' and then passed downwardly through an opening in the bearing 7' at one side of the standard. After passing through the bearing 7', the cable passes around the pulley 14 and then upwardly through an opening in bearing 7' on the opposite side of standard 8.

After passing through bearing 7', the cable passes upwardly over pulley 16 and through the tube 19 to be wound upon the drum 20, the crank 29 being actuated for winding the cable on the drum 20 or unwinding the same therefrom. Therefore, when a load is placed upon the head 9 of the drum, it will be necessary to manually actuate the drum, to lower the standard into the cylinder 4.

Normally the standard 8 and the head 9 are arranged in a position, as shown in Figure 1, and the head 9 is preferably provided with a low central part 31, forming slightly inclined side walls whereby the front or rear axle of an automobile may readily rest upon the head. In using my improved device, attention is directed to the fact that normally the standard 8 is raised in a lowered position within the cylinder 4, as shown in Figure 1.

When it is desired to raise one end of a motor vehicle, such as shown in Figure 3, the vehicle is moved to a position whereby one of the axles thereof will be arranged above the head 9. The crank arm 29 is then actuated to rotate the drum 20, and as the cable 30 is wound thereon, the standard will be raised within the cylinder 4, engaging the head 9 with the axle of the vehicle and further continued movement of the drum will raise the vehicle to the position shown in Figure 3.

Any suitable means may be used for locking the drum against rotation when the standard is in a raised position and it will be apparent that the load positioned upon the upper end of the standard will return the standard to its lowered position upon release of the locking means.

It will be apparent from the foregoing, that I have provided a very simple and inexpensive device which can be placed in position within garages, or used where it is desired to lift either end of a motor vehicle for repair purposes or for inspection purposes.

The device is very simple in construction and can be manufactured at a comparatively low cost and is very easy to operate.

I claim:

A lifting device comprising an imbedded casing, a guide cylinder in said casing rigidly connected therewith, an embedded gear casing spaced from the first casing, a guide tube connecting the casings together, a bearing cap fitted in the upper end of the cylinder, a second bearing secured in the cylinder in spaced relation to the bearing cap, a standard slidably mounted in the bearings, a lifting head on the upper end of the standard, a pulley carried by the lower end of the standard, a winding drum rotatably mounted in the gear casing, a pulley rotatably mounted in the first casing adjacent to the upper end end of the cylinder and one end of the guide tube, a cable secured to the bearing cap and trained over said pulleys and threaded through the guide tube and wound upon said drum, an operating shaft rotatably mounted in the gear casing and extending externally thereof, means for rotating the shaft, and a worm and a worm-wheel connected between the shaft and drum.

In testimony that I claim the foregoing I have hereunto set my hand at Allentown, in the county of Lehigh and State of Pennsylvania.

GEORGE P. BALL.